US011296380B2

(12) United States Patent
Miler et al.

(10) Patent No.: US 11,296,380 B2
(45) Date of Patent: Apr. 5, 2022

(54) BATTERY PACKS HAVING STRUCTURAL MEMBERS FOR IMPROVING THERMAL MANAGEMENT

(71) Applicant: Apple Inc., Cupertino, CA (US)

(72) Inventors: Josef L. Miler, San Francisco, CA (US); Luke A. Wilhelm, Sausalito, CA (US); Andrew C. Chu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 280 days.

(21) Appl. No.: 16/259,440

(22) Filed: Jan. 28, 2019

(65) Prior Publication Data

US 2019/0157635 A1 May 23, 2019

Related U.S. Application Data

(63) Continuation of application No. PCT/US2017/044316, filed on Jul. 28, 2017.

(Continued)

(51) Int. Cl.
*H01M 50/20* (2021.01)
*H01M 10/653* (2014.01)

(Continued)

(52) U.S. Cl.
CPC ......... *H01M 50/20* (2021.01); *H01M 10/653* (2015.04); *H01M 10/655* (2015.04);

(Continued)

(58) Field of Classification Search
CPC ...... H01M 50/20; H01M 50/24; H01M 50/30; H01M 50/147; H01M 10/653; H01M 10/66

See application file for complete search history.

(56) References Cited

U.S. PATENT DOCUMENTS 3,053,435 A 9/1962 Sanders et al.
8,956,747 B2 2/2015 Itoi et al.

(Continued)

FOREIGN PATENT DOCUMENTS

CN 2601463 Y 1/2004
CN 101326657 A 12/2008

(Continued)

OTHER PUBLICATIONS

English translation of Joye et al (WO 2011/134828) obtained from Google Patents Mar. 11, 2021.*

(Continued)

*Primary Examiner* — Sarah A. Slifka
(74) *Attorney, Agent, or Firm* — Kilpatrick Townsend & Stockton

(57) ABSTRACT

Battery packs are presented having structural members for improving thermal management of battery cells therein. In some embodiments, the battery packs include a first end-member positioned opposite a second end-member and parallel thereto. The battery packs also include a first side beam positioned opposite a second side beam and parallel thereto. The first side beam and the second side beam extend longitudinally between the first end-member and the second end-member. A longitudinal member is disposed between the first side beam and the second side beam and defines a plurality of longitudinal rows. The battery packs may additionally include a lateral member disposed between first end-member and the second end-member to partition the plurality of longitudinal rows into an array of battery cell compartments. A battery cell is disposed within at least one battery cell compartment.

22 Claims, 10 Drawing Sheets

Related U.S. Application Data

(60) Provisional application No. 62/368,779, filed on Jul. 29, 2016.

(51) Int. Cl.

| | |
|---|---|
| ***H01M 10/66*** | (2014.01) |
| ***H01M 10/655*** | (2014.01) |
| ***H01M 50/24*** | (2021.01) |
| ***H01M 50/30*** | (2021.01) |
| ***H01M 50/147*** | (2021.01) |

(52) U.S. Cl.

CPC ......... *H01M 10/66* (2015.04); *H01M 50/147* (2021.01); *H01M 50/24* (2021.01); *H01M 50/30* (2021.01)

(56) References Cited

U.S. PATENT DOCUMENTS

| | | | |
|---|---|---|---|
| 10,923,788 | B1 | 2/2021 | Loveness et al. |
| 2006/0127765 | A1 | 6/2006 | Machida et al. |
| 2006/0172187 | A1 | 8/2006 | Ambrosio et al. |
| 2009/0274952 | A1 | 11/2009 | Wood et al. |
| 2010/0055556 | A1 | 3/2010 | Meschter |
| 2010/0136391 | A1 | 6/2010 | Prilutsky et al. |
| 2010/0279152 | A1 | 11/2010 | Payne |
| 2011/0020676 | A1 | 1/2011 | Kurosawa |
| 2011/0111273 | A1 | 5/2011 | Okada et al. |
| 2011/0195284 | A1 | 8/2011 | Yasui et al. |
| 2012/0002338 | A1 | 1/2012 | Smith et al. |
| 2013/0078488 | A1 | 3/2013 | Nemoto et al. |
| 2013/0295428 | A1 | 11/2013 | Hatta et al. |
| 2014/0162107 | A1 | 6/2014 | Obrist et al. |
| 2014/0302368 | A1 | 10/2014 | Wang et al. |
| 2014/0318106 | A1 | 10/2014 | Mizuno et al. |
| 2014/0329121 | A1 | 11/2014 | Nishihara |
| 2015/0244036 | A1 | 8/2015 | Lane et al. |
| 2016/0020447 | A1 | 1/2016 | Janarthanam et al. |
| 2016/0197385 | A1 | 7/2016 | Matsumoto et al. |
| 2016/0218336 | A1 | 7/2016 | Herrmann et al. |
| 2017/0162917 | A1 | 6/2017 | Yu et al. |
| 2019/0267682 | A1 | 8/2019 | Seo et al. |

FOREIGN PATENT DOCUMENTS

| | | | |
|---|---|---|---|
| CN | 101523637 | A | 9/2009 |
| CN | 101627490 | A | 1/2010 |
| CN | 102054951 | A | 5/2011 |
| CN | 204243106 | U | 4/2015 |
| CN | 105518899 | A | 4/2016 |
| CN | 205177921 | U | 4/2016 |
| CN | 105742535 | A | 7/2016 |
| DE | 102013015749 | A1 | 3/2015 |
| EP | 1091438 | A2 | 4/2001 |
| EP | 2262048 | A1 | 12/2010 |
| EP | 2320493 | A1 | 5/2011 |
| JP | 2011175844 | A | 9/2011 |
| WO | 2011134815 | A1 | 11/2011 |
| WO | 2011134828 | A1 | 11/2011 |
| WO | 2018022964 | A1 | 2/2018 |
| WO | 2018023050 | A1 | 2/2018 |

OTHER PUBLICATIONS

U.S. Appl. No. 15/703,114, "Non-Final Office Action", dated Aug. 22, 2019, 20 pages.

U.S. Appl. No. 15/885,126, "Non-Final Office Action", dated Jan. 6, 2020, 20 pages.

U.S. Appl. No. 15/794,200, "Notice of Allowance", dated Oct. 29, 2020, 8 pages.

U.S. Appl. No. 16/259,584, "Non-Final Office Action", dated Nov. 10, 2020, 16 pages.

Klambauer, et al., "cn.MOPS: Mixture of Poissons for Discovering Copy Number Variations in Next-Generation Sequencing Data with a Low False Discovery Rate", Nucleic Acids Research, vol. 40, No. 9, Feb. 1, 2012, pp. 1-14.

PCT/US2017/044316, "International Search Report and Written Opinion", dated Nov. 15, 2017, 10 pages.

U.S. Appl. No. 15/703,114, "Final Office Action", dated Mar. 16, 2020, 22 pages.

U.S. Appl. No. 15/794,200, "Non-Final Office Action", dated Mar. 19, 2020, 23 pages.

U.S. Appl. No. 15/885,126, "Final Office Action", dated Sep. 3, 2020, 14 pages.

PCT/US2017/044316, "International Preliminary Report on Patentability", dated Feb. 7, 2019, 7 pages.

PCT/US2017/044474, "International Preliminary Report on Patentability", dated Feb. 7, 2019, 9 pages.

PCT/US2017/044474, "International Search Report and Written Opinion", dated Oct. 24, 2017, 12 pages.

U.S. Appl. No. 15/885,126, "Non-Final Office Action", dated Aug. 10, 2021, 15 pages.

U.S. Appl. No. 16/259,584, "Final Office Action", dated Jun. 7, 2021, 13 pages.

U.S. Appl. No. 16/263,907, "Non-Final Office Action", dated Mar. 30, 2021, 12 pages.

China Patent Application No. 201910307710.1, "Office Action", dated Jul. 26, 2021, 17 pages.

China Patent Application No. 201910339097.1, "Office Action", dated Jun. 29, 2021, 12 pages.

U.S. Appl. No. 16/263,907, "Non-Final Office Action", dated Nov. 1, 2021, 11 pages.

* cited by examiner

BATTERY PACKS HAVING STRUCTURAL MEMBERS FOR IMPROVING THERMAL MANAGEMENT

CROSS-REFERENCE TO RELATED APPLICATION

This application is a continuation of International Patent Application No. PCT/US2017/044316, filed Jul. 28, 2017, which claims the benefit of U.S. Application Ser. No. 62/368,779, filed Jul. 29, 2016, the disclosures of which are hereby incorporated by reference in their entirety for all purposes.

FIELD

This disclosure relates generally to battery packs.

BACKGROUND

In some designs, battery cells are packaged in groups (called packs) to aggregate overall storage of electrical energy. A battery pack includes a structure that houses or otherwise holds together constituent battery cells. Battery pack design may involve compromises. For example, packaging battery cells closely increases overall energy density, which is beneficial, but may also increase heat transfer between battery cells, which may not be beneficial, at temperature extremes.

SUMMARY

In some embodiments, a battery pack for packaging an array of battery cells includes a first end-member positioned opposite a second end-member and parallel thereto. The battery pack also includes a first side beam positioned opposite a second side beam and parallel thereto. The first side beam and the second side beam extend longitudinally between the first end-member and the second end-member. A longitudinal member is disposed between the first side beam and the second side beam and defines a plurality of longitudinal rows. The battery pack additionally includes a lateral member disposed between the first end-member and the second end-member to partition the plurality of longitudinal rows into an array of battery cell compartments. A battery cell is disposed within at least one battery cell compartment. At least one of the longitudinal member, the first side beam, and the second side beam are configured to be in tension when the array of battery cell compartments contains a longitudinal row of battery cells extending from the first end-member to the second end-member.

In some instances, the battery cell includes an aluminum can. In other instances, the battery cell includes a steel can.

In some instances, the battery pack includes a jacket enclosing one or more battery cells disposed within each battery cell compartment and having apertures configured to expose terminals of the one or more battery cells. In some instances, the battery pack includes a sleeve covering one or more battery cells disposed within each battery cell compartment and having a first portion and a second portion. The first portion covers the battery cells along first sides having terminals disposed therein, or covers the battery cells along first sides opposite sides having terminals disposed therein. The first portion may have apertures configured to expose terminals of the battery cells. The second portion covers second sides of the battery cells. The second sides are adjacent the first sides. In some instances, the battery pack includes a base panel having openings configured to expose cell vents of the battery cell. The battery pack also includes a cover panel having apertures configured to expose terminals of the battery cell. In these instances, the longitudinal member divides the lateral member, the first end-member, and the second end-member into separate portions.

In other embodiments, a battery pack includes a tubular structure. The tubular structure includes a base member having a bottom wall extending from a first side wall to a second side wall. The tubular structure also includes a cover member coupled to the base member to define a channel therebetween. The cover member has apertures configured to expose terminals of the battery cells. The tubular structure additionally includes a lateral member disposed within the channel to divide the channel into a plurality of battery cell compartments. A first end-member is disposed at a first end of the channel. A second end-member is disposed at a second end of the channel. At least one of the base member and the cover member are configured to be in tension when the plurality of battery cell compartments contains a row of battery cells extending from the first end-member to the second end-member. The battery pack also includes a battery cell disposed within at least one battery cell compartment.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The embodiments described herein are directed to structures for housing multiple battery cells, i.e., for forming a battery pack. The battery packs may include structural members that serve multiple functions, such as load-bearing, thermal-management, confinement, battery compression, and so forth.

In some embodiments, the structural members improve a stiffness of the battery packs to vertical loads while improving thermal management among a plurality (e.g., array) of battery cell compartments. Such thermal management includes managing heat flow between neighboring battery cells, and in some instances assists a flow of thermal energy out of the battery cells. In another aspect, the structural members are configured to pack the battery cells in a space-efficient arrangement. This space-efficient arrangement increases a volume allocated to storing electrical energy. In yet another aspect, the structural members compress the battery cells when disposed within the plurality of battery cell compartments. Such compression may reduce swelling of the battery cells during operation (e.g., charging, discharging, etc.). Reduced swelling may improve performance, lifetime, or both, of the battery cells.

As used herein, the term "thermal management" refers to a regulation of thermal energy flowing into and out of one or more battery cells within a battery pack. The term "thermal management" may also refer to a control or confinement of thermally-induced chemical reactions (and their by-products) that result from electrochemical processes within battery cells.

Figure 1A:
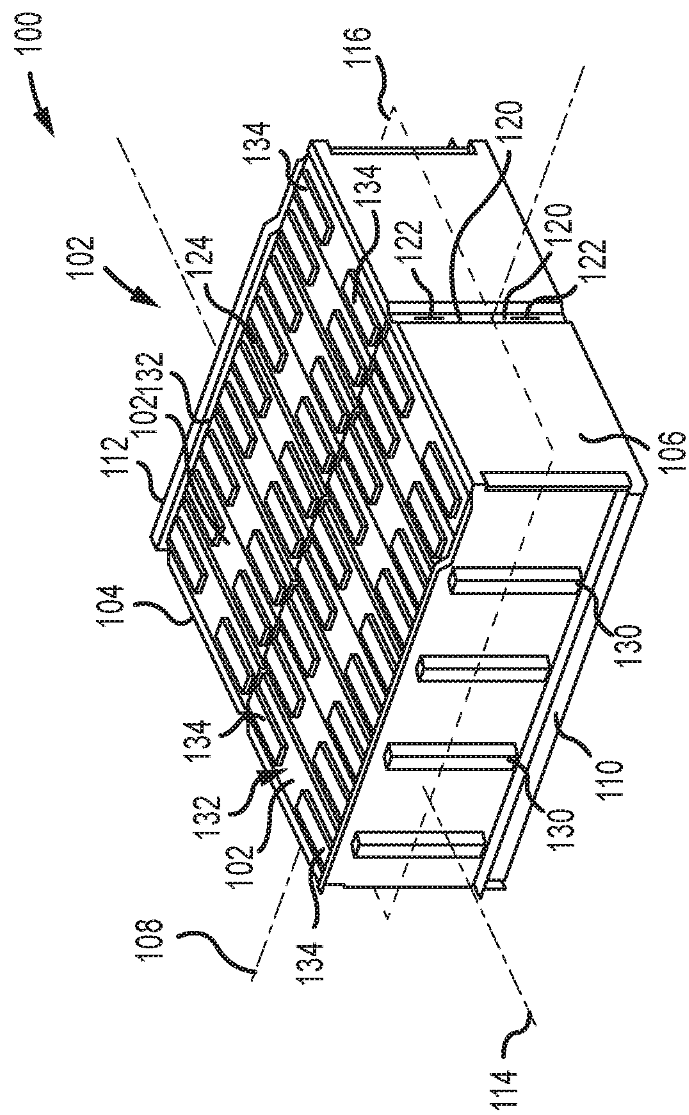
FIG. 1A is a perspective view of a battery pack for packaging an array of battery cells within structural members that provide thermal management, according to an illustrative embodiment.
Figure 1B:
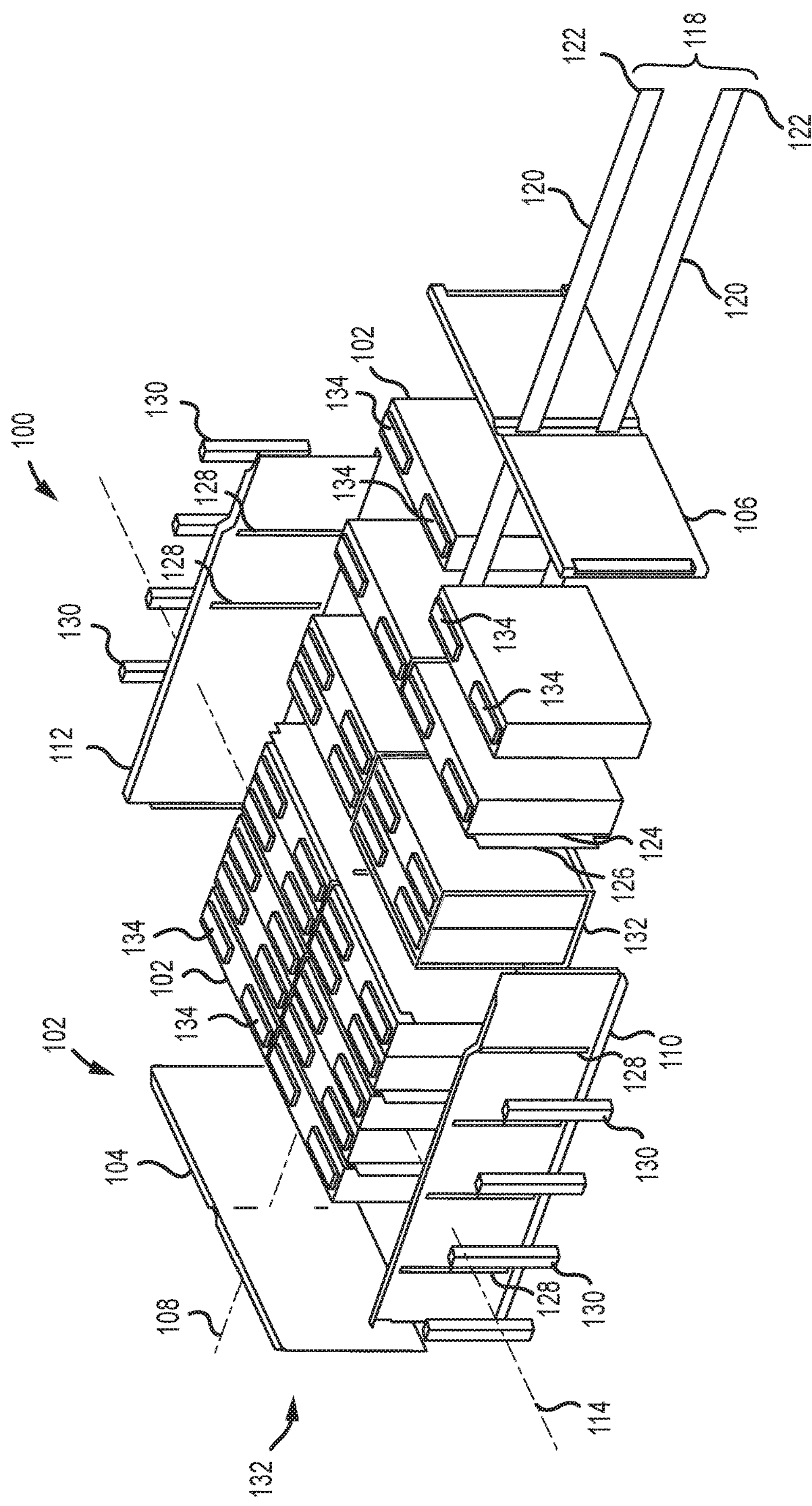
FIG. 1B is an exploded view of the battery pack of FIG. 1A.

Now referring to FIG. 1A, a perspective view is presented of a battery pack 100 for packaging an array of battery cells 102 within structural members that provide thermal management, according to an illustrative embodiment. FIG. 1B provides an exploded view of the battery pack 100 illustrated in FIG. 1A. The battery pack 100 includes a first end-member 104 positioned opposite a second end-member 106 and parallel thereto. The first end-member 104 and the second end-member 106 may be disposed normal to a longitudinal axis 108 of the battery pack 100. The first end-member 104 and the second end-member 106 are operable to apply pressure longitudinally against the array of battery cells 102 within the battery pack 100. In some embodiments, the first end-member 104, the second end-member 106, or both include plate structures.

The battery pack 100 also includes a first side beam 110 positioned opposite a second side beam 112 and parallel thereto. The first side beam 110 and the second side beam 112 may be disposed normal to a lateral axis 114 of the battery pack 100. The first side beam 110 and the second side beam 112 extend longitudinally between the first end-member 104 and the second end-member 106. Such extension may define a perimeter 116 (see dashed line in FIG. 1A) with the first end-member 104 and the second end-member 106. Exemplary pack 100 has perimeter 116 that is rectangular. In some embodiments, the first side beam 110 and the second side beam 112 apply pressure laterally against the array of battery cells 102 within the battery pack 100.

The first side beam 110 and the second side beam 112 may be coupled to the first end-member 104 and the second end-member 106 via welds, brazes, adhesives (e.g. epoxies, cements, etc.), fasteners (e.g., bolts, rivets, etc.), or some combination thereof. Moreover, cross-sections for the first side beam 110 and the second side beam 112 may vary depending on requirements for stiffness and weight. Non-limiting examples of cross-sections include I-beams, T-beams, C-channels, L-beams, solid squares, hollow squares, solid rectangles, hollow rectangles, solid rounds, and hollow rounds. Other cross-sections are possible.

Turning to FIG. 1B, battery pack 100 in some embodiments includes a longitudinal member 118 disposed between the first side beam 110 and the second side beam 112 and defining a plurality of longitudinal rows. The longitudinal member 118 may be formed using multiple components, as shown in FIGS. 1A and 1B. In some embodiments, the longitudinal member 118 includes two straps 120, each having a first end (not shown) and a second end 122 coupled to, respectively, the first endplate 104 and the second endplate 106.

Although a single longitudinal member 118 is depicted in FIGS. 1A and 1B, this depiction is not intended as limiting. Any number of longitudinal members 118 is possible for the battery pack 100 (i.e., the battery pack 100 includes a plurality of longitudinal members 118). In some instances, the longitudinal member 118 is disposed between the first side beam 110 and the second side beam 112 such that the plurality of longitudinal rows have equal widths. In other instances, the longitudinal member 118 is disposed between the first side beam 110 and the second side beam 112 such that the plurality of longitudinal rows have different widths. In general, a position of the longitudinal member 118 may be selected to set a width of one or more longitudinal rows within the battery pack 100. Non-limiting examples of the longitudinal member 118 include sheets, plates, and slats. Other types of longitudinal members 118 are possible.

The battery pack 100 also includes a lateral member 124 disposed between the first end-member 104 and the second end-member 106 to partition the plurality of longitudinal rows into an array of battery cell compartments. The lateral member 124 may be formed using multiple components. In some embodiments, such as that shown in FIGS. 1A and 1B, the battery pack 100 includes a plurality of lateral members 124. However, in some embodiments, a single lateral member 124 is possible. In general, a number and position of the lateral member 124 may be selected to determine, respectively, a number and width of one or more lateral rows within the battery pack 100.

In exemplary pack 100, lateral member(s) 124 connect to first side beam 110 and second side beam 112. The lateral member 124 may have opposite ends that include a tab. One or both of the opposite ends may include the tab. The tab may assist in coupling the lateral member 124 to the first side beam 110, the second side beam 112, or both. In some embodiments, the lateral member 124 includes a first tab (not shown) and a second tab 126 at opposite ends. In these embodiments, the first tab and the second tab 126 protrude through slots 128 in, respectively, the first side beam 110 and the second side beam 112. In some embodiments, the first tab and the second tab 126 are coupled to, respectively, the first side beam 110 and the second side beam 112 via a fastener 130.

The lateral member 124, in combination with the longitudinal member 118, partitions a volume bounded by the first end-member 104, the second end-member 106, the first side beam 110, and the second side beam 112 into an array of battery cell compartments 132 (see solid line). The array of battery cell compartments 132 may correspond to an array of rectangular volumes, such as depicted in FIGS. 1A and 1B. However, this depiction is not intended as limiting. Other volumetric shapes are possible for the array of battery cell compartments 132. It will be appreciated that longitudinal members 118 and lateral members 124 may be chosen in any number and position to define any quantity and size of battery cell compartments 132 within the battery pack 100. By such selection, a space-efficient packaging of battery cells 102 may be achieved within the battery pack 100. In some embodiments, battery cells 102 are prismatic cells, and the packaging of battery 100 may involve no appreciable gaps between abutting battery cells.

In some embodiments, the longitudinal member 118 and the lateral member 124 are formed of sheets or thin plates. Longitudinal member 118 and the lateral member 124 may allow a close packing of adjacent battery cells 102. Non-limiting examples of materials for the sheets or thin plates include metals (e.g., aluminum, steel, etc.), ceramics (e.g., silica, alumina, etc.), glasses (e.g., borosilicate glass, amorphous carbon, etc.), composites (e.g., carbon-fiber or graphene laminates), and plastics (e.g., polyetherketones, polyphenylene sulfide, etc.). Other materials are possible, including combinations of materials.

In some embodiments, at least one of the longitudinal members 118, the first side beam 110, and the second side beam 112 are configured to be in tension when the array of battery cell compartments 132 contains a longitudinal row of battery cells 102 extending from the first end-member 104 to the second end-member 106. In some embodiments, at least one of the lateral member 124, the first endplate 104, and the second endplate 106 are configured to be in tension when the array of battery cell compartments 132 contains a lateral row of battery cells 102 extending from the first side beam 110 to the second side beam 112.

Longitudinal tensioning predisposes the end-members 104, 106 to compress the battery cells 102 along the longitudinal axis 108. Similarly, lateral tensioning predisposes the side beams 110, 112 to compress the battery cells 102 along the lateral axis 114. Such compression may reduce swelling of the battery cells 102 during operation (e.g., during charging, discharging, etc.). Reduced swelling may improve performance, lifetime, or both, of the array of battery cells 102. The tensioning also holds battery cells 102 in place during movement of pack 100.

It will be appreciated that the longitudinal member 118 and the lateral member 124 serve as "webbing" within the volume bounded by the first end-member 104, the second end-member 106, the first side beam 110, and the second side beam 112 (i.e., bounded by the perimeter 116.) In some embodiments, this "webbing" stiffens the battery pack 100 while simultaneously improving thermal management. Stiffening of the battery pack 100 improves resistance to loads, e.g., vertical loads perpendicular to a plane defined by the longitudinal axis 108 and the lateral axis 114. This improved resistance allows the battery pack 100 to incorporate longer rows of battery cells 102 (i.e., along the longitudinal axis 108, the lateral axis 114, or both) than those associated with conventional battery packs. In some embodiments, stiffness of the battery pack 100 may be modified by altering a longitudinal tension of the longitudinal member 118, the first side beam 110, the second side beam 112, or any combination thereof. In some embodiments, the stiffness of the battery pack 100 may be modified by altering lateral tension of the lateral member 124, the first end-member 104, the second end-member 106, or any combination thereof.

The thermal functionality of the "webbing" is aided by a compartmentalized configuration, which helps isolate potential heat sources within controlled volumes. Such controlled volumes are bounded by walls associated with individual battery cell compartments 132. As discussed below, in some examples, battery cell compartment 132 is walled by a jacket. In some examples, battery cell compartment 132 is walled by a sleeve. In some examples, battery cell compartment 132 is walled by portions of the longitudinal member 118 and the lateral member 124. These walls optionally include one or more insulative materials to enhance the thermal functionality. In some instances, the walls may include coatings or linings of thermally-insulating material (e.g., porous ceramics), thermally-conductive material (e.g., copper), intumescent material, or any combination thereof. In some instances, the walls may be thermally-coupled to a heat exchanger. This compartmentalized configuration increases volumetric density of battery pack 100 while allowing for proper thermal management.

The thermal functionality of the "webbing" impedes thermal energy from propagating between neighboring battery cells 102 and/or battery cell compartments 132. However, the "webbing" may also conduct thermal energy out of the array of battery cells 102. For example, and without limitation, the "webbing" may be configured to conduct thermal energy vertically out of the array of battery cells 102. In some embodiments, such conduction is assisted by anisotropic materials lining the array of battery cell compartments 132 (e.g., graphene sheets coating walls of the array of battery cell compartments 132). Anisotropic materials may have a high thermal resistance along a first direction that connects neighboring battery cells 102 and a low thermal resistance along a second direction that is perpendicular to the first direction.

The battery cells 102 may be disposed within the battery pack 100 to yield an array of battery cells. In some embodiments, the array of battery cells 102 occupies greater than 84% of the volume enclosed by the perimeter 116. In some embodiments, the array of battery cells 102 occupies greater than 86% of the volume enclosed by the perimeter 116. In some embodiments, the array of battery cells 102 occupies greater than 88% of the volume enclosed by the perimeter 116. In some embodiments, the array of battery cells 102 occupies greater than 90% of the volume enclosed by the perimeter 116. In some embodiments, the array of battery cells 102 occupies greater than 92% of the volume enclosed by the perimeter 116. In some embodiments, the array of battery cells 102 occupies greater than 94% of the volume enclosed by the perimeter 116. In some embodiments, the array of battery cells 102 occupies greater than 96% of the volume enclosed by the perimeter 116. In some embodiments, the array of battery cells 102 occupies greater than 98% of the volume enclosed by the perimeter 116.

In some embodiments, such as that depicted in FIGS. 1A and 1B, each battery cell compartment 132 of the array of battery cell compartments 132 is configured to contain two battery cells 102 therein. However, this depiction is not intended as limiting. Other numbers of battery cells 102 may be contained within each battery cell compartment 132, including differing numbers of battery cells 102 within differing battery cell compartments. In some embodiments, the array of battery cell compartments 132 is configured such that battery cells 102 disposed therein have terminals 134 aligned parallel to the lateral member 124.

Materials for components of the battery pack 100 may be selected by those skilled in the art based on considerations of yield strength, elastic modulus, thermal conductivity, and melting point. Other considerations are possible.

In some embodiments, at least one of the first end-member 104, the second end-member 106, the first side beam 110, and the second side beam 112 comprise a material having a yield strength greater than 250 MPa. In some embodiments, at least one of the first end-member 104, the second end-member 106, the first side beam 110, and the second side beam 112 comprise a material having a yield strength greater than 275 MPa. In some embodiments, at least one of the first end-member 104, the second end-member 106, the first side beam 110, and the second side beam 112 comprise a material having a yield strength greater than 300 MPa. In some embodiments, at least one of the first end-member 104, the second end-member 106, the first side beam 110, and the second side beam 112 comprise a material having a yield strength greater than 325 MPa. In some embodiments, at least one of the first end-member 104, the second end-member 106, the first side beam 110, and the second side beam 112 comprise a material having a yield strength greater than 350 MPa. In some embodiments, at least one of the first end-member 104, the second end-member 106, the first side beam 110, and the second side beam 112 comprise a material having a yield strength greater than 375 MPa.

In some embodiments, at least one of the first end-member 104, the second end-member 106, the first side beam 110, and the second side beam 112 comprise a material having an elastic modulus greater than 65 GPa. In some embodiments, at least one of the first end-member 104, the second end-member 106, the first side beam 110, and the second side beam 112 comprise a material having an elastic modulus greater than 80 GPa. In some embodiments, at least one of the first end-member 104, the second end-member 106, the first side beam 110, and the second side beam 112 comprise a material having an elastic modulus greater than 95 GPa. In some embodiments, at least one of the first end-member 104, the second end-member 106, the first side beam 110, and the second side beam 112 comprise a material having an elastic modulus greater than 110 GPa.

In some embodiments, at least one of the first end-member 104, the second end-member 106, the first side beam 110, and the second side beam 112 comprise aluminum or an aluminum alloy (e.g., 2024, 6061, 7075, etc.). In other embodiments, at least one of the first end-member 104, the second end-member 106, the first side beam 110, and the second side beam 112 comprise steel (e.g., 304, 316, 1018, 4140, etc.). In still other embodiments, at least one of the first end-member 104, the second end-member 106, the first side beam 110, and the second side beam 112 comprise titanium or a titanium alloy (e.g., Grade 1, Grade 2, Grade 5, Grade 23, etc.).

In some embodiments, the longitudinal member 118 and the lateral member 124 comprise a material having a thermal conductivity greater than 10 μm/m·° C. In some embodiments, the longitudinal member 118 and the lateral member 124 comprise a material having a melting point greater than 550° C. In some embodiments, the longitudinal member 118 and the lateral member 124 comprise steel (e.g., 304, 316, 1018, 4140, etc.). In still other embodiments, the longitudinal member 118 and the lateral member 124 comprise titanium or a titanium alloy (e.g., Grade 1, Grade 2, Grade 5, Grade 23, etc.).

In some embodiments, battery cells 202 have aluminum cans. The aluminum can may be formed of aluminum or an aluminum alloy (e.g., 2024, 6061, 7075, etc.). In other embodiments, battery cells 202 have steel cans. The steel can may be formed of any type of steel alloy (e.g., 304, 316, 1018, 4140, etc.).

Figure 2A:
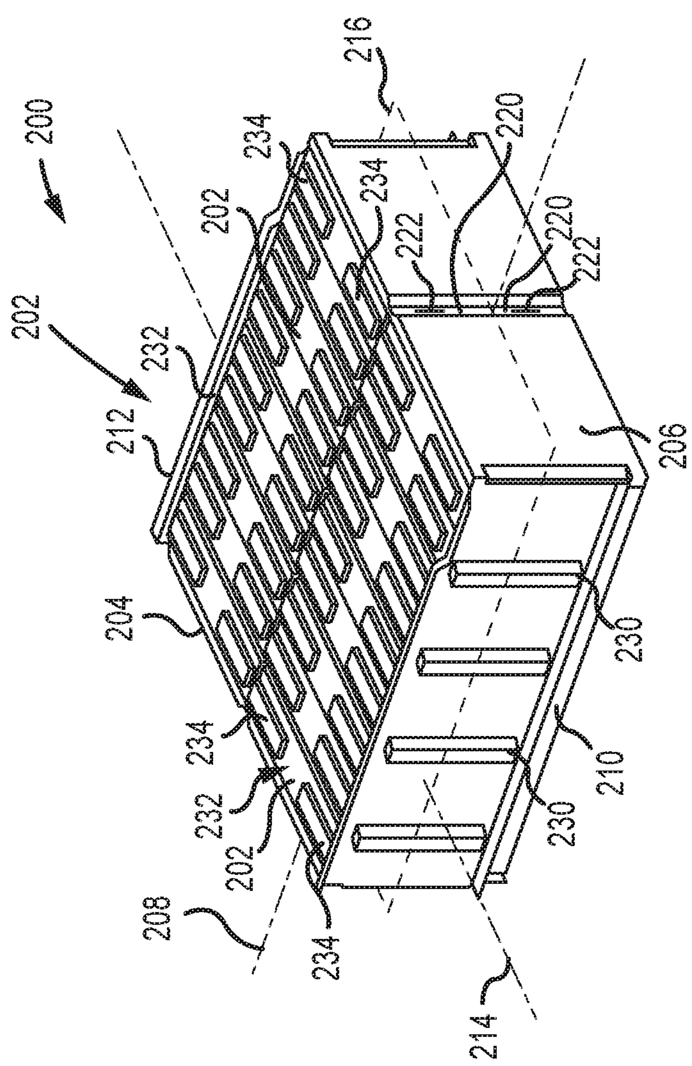
FIG. 2A is a perspective view of a battery pack having structural members that provide thermal management, according to an illustrative embodiment.
Figure 2B:
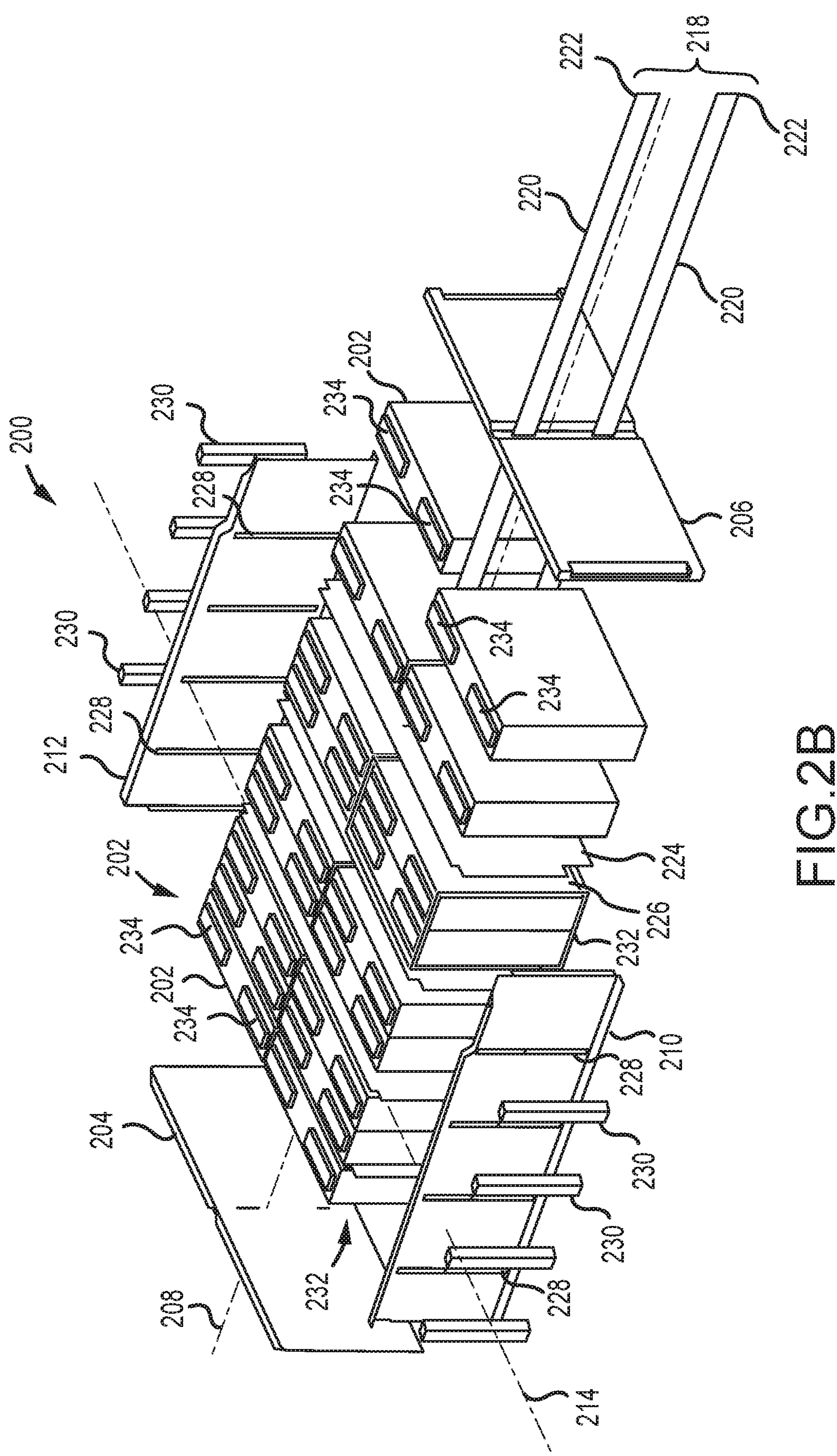
FIG. 2B is an exploded view of the battery pack of FIG. 2A.

FIG. 2A is a perspective view of exemplary battery pack 200. FIG. 2B is an exploded view illustrating an exemplary construction of battery pack 200 in accordance with some embodiments. Battery pack 200 may include similar components as discussed with regard to battery pack 100, and may include any of the features or components previously described. For example, battery pack 200 as illustrated may include an array of battery cells 202 disposed in battery cell compartments 232, which may include or contain a plurality of battery cells including at least two, at least four, at least six, or more battery cells 202 within each battery cell compartment 232. The battery cell compartments 232 may be at least partially defined by first end-member 204, second end-member 206, first side beam 210, and second side beam 212, which may define a perimeter 216.

A longitudinal member 218 may be positioned within the battery pack along a longitudinal axis 208. Longitudinal member 218 may include straps 220 including ends 222. Additionally, one or more lateral members 224 may be positioned along a lateral axis 214. Lateral members 224 may define tabs 226 on either or both ends of the structure, which may couple through slots 228 in first side beam 210 and/or second side beam 212. Fasteners 230 may be used to couple tabs 226 with the associated side beams. Battery cells 202 may have terminals 234 on a side different than that of a cell vent (e.g., an opposite side, adjacent side, top side, etc.). The terminals 234 may be disposed on a top side of the battery cell 202 and the cell vent disposed on a bottom side of the battery cell 202.

Two or more battery cells 202 are disposed within at least one battery cell compartment 232 of the array of battery cell compartments 232. Optionally, a thermal divider is disposed between adjacent battery cells 202. The thermal divider may be a thermally-insulating material (e.g., porous ceramics), a thermally-conductive material (e.g., copper), an intumescent material, or any combination thereof.

Figure 2C:
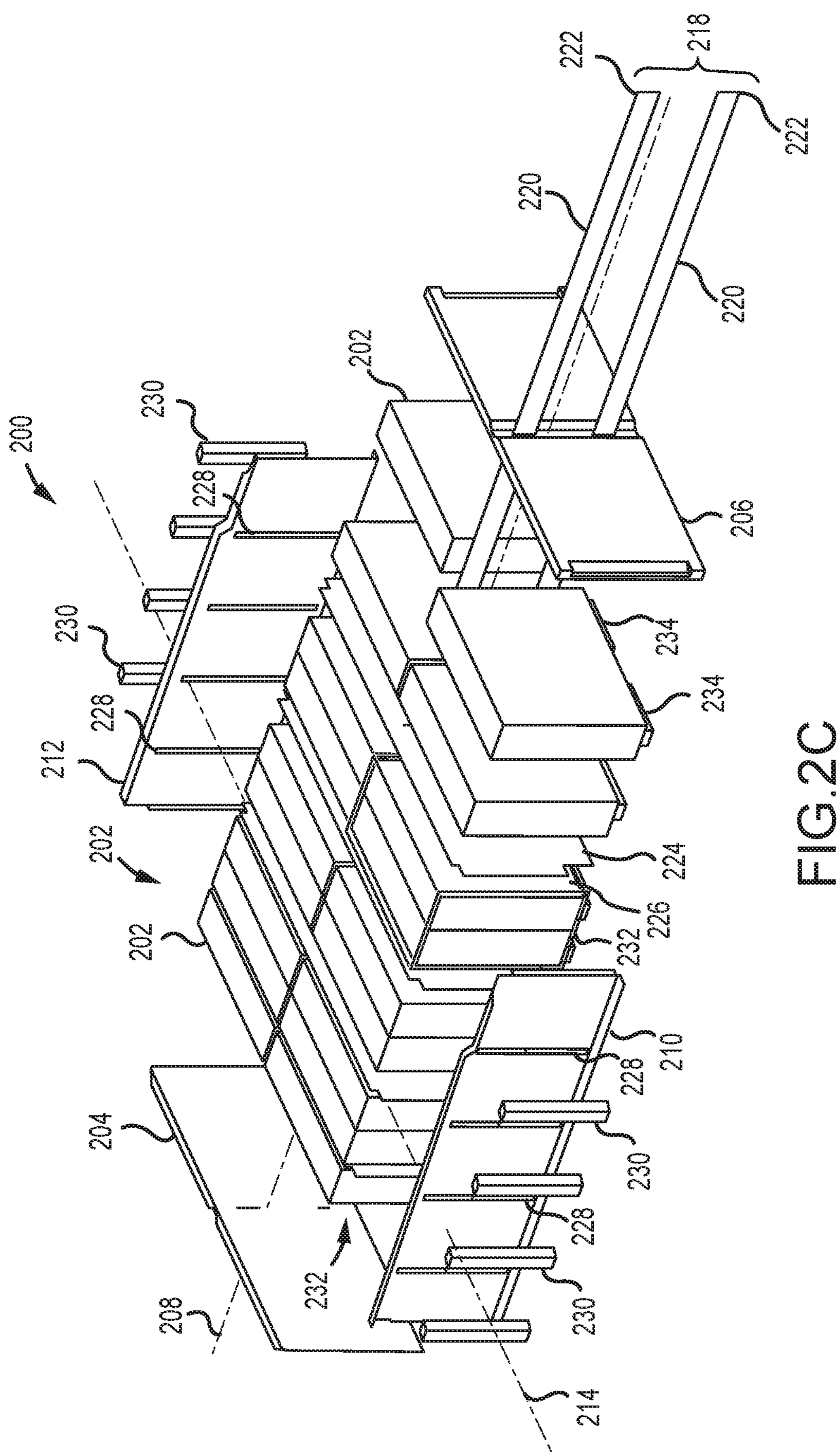
FIG. 2C is an exploded view of a battery pack according to illustrative embodiments.

FIG. 2C illustrates an exploded view of an embodiment of a battery pack 200 according to the present technology. The battery pack may include similar components as previously discussed with regard to FIG. 2A, while illustrating an additional arrangement of the battery cells 202. In some embodiments as illustrated, battery cells 202 may be positioned within the battery pack having the terminals 234 facing down. The terminals may be located on a similar surface of the battery cells 202 as the vent, or may be positioned on an opposite or adjacent surface of the battery cells as the vent.

Figure 2D:
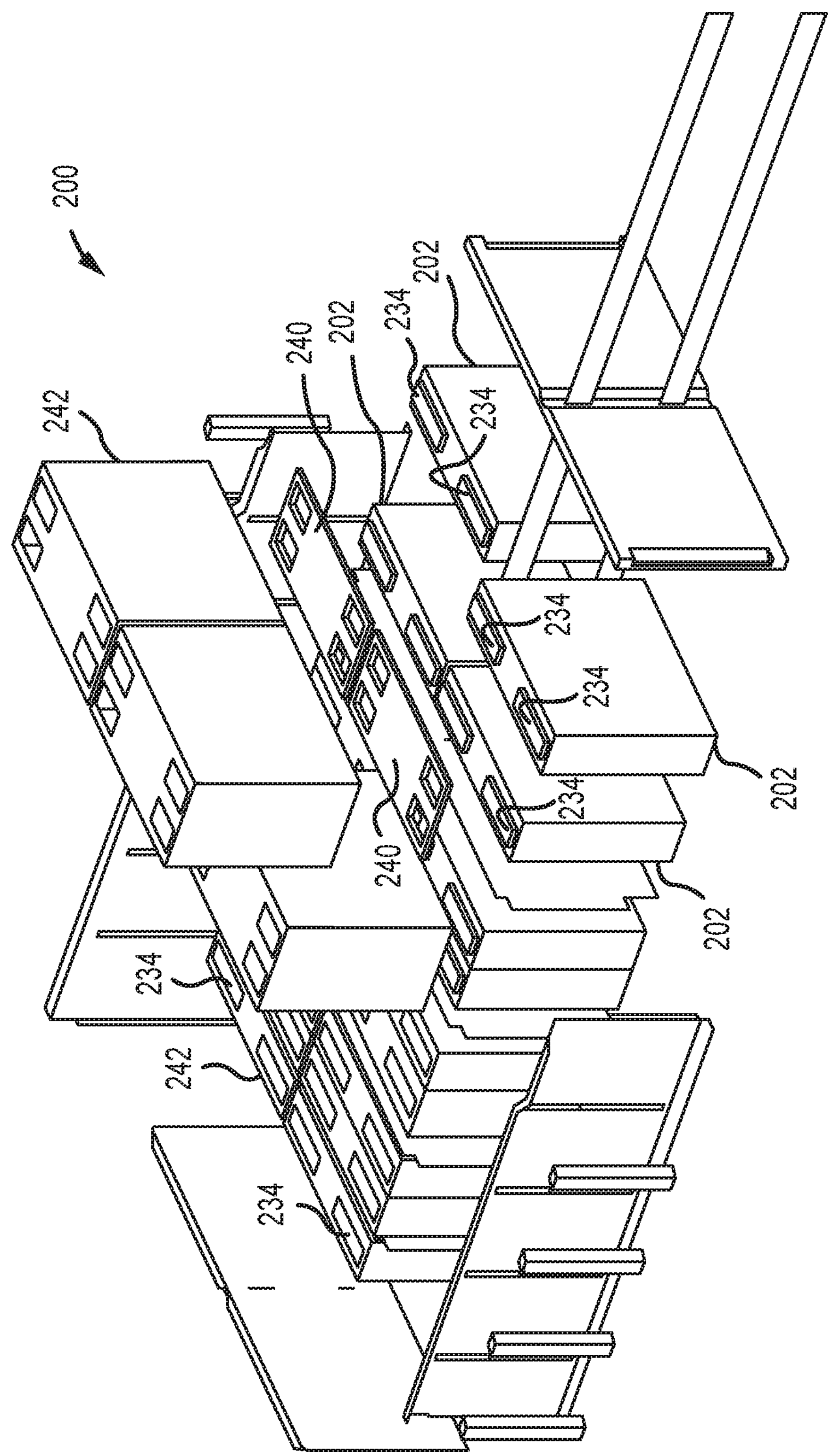
FIG. 2D is an exploded view of the battery pack of FIG. 2A, but in which jackets enclose the battery cells, according to an illustrative embodiment.

FIG. 2D is an exploded view illustrating an exemplary construction of battery pack 200 in accordance with some embodiments. In the example of FIG. 2D, jackets 242 in battery pack 200 encloses battery cells 202, further organizing battery cells into battery cell compartments. The battery pack 200 includes a jacket 242 enclosing one or more battery cells 202 disposed within each battery cell compartment 232. Jacket 242 optionally includes apertures configured to expose terminals 234 of the one or more battery cells 202. Optionally, an electrically-insulating member 240 is disposed over the side of the battery cell 202 having terminals 234. Jacket 242 optionally provides an opening configured to receive battery cells 202. In FIG. 2D, the jacket 242 is depicted as enclosing two battery cells 202. However, this depiction is not intended as limiting. The jacket 242 may enclose any number of battery cells 202. In some embodiments, the jacket 242 includes steel (e.g., 304, 316, 1018, 4140, etc.).

Figure 2E:
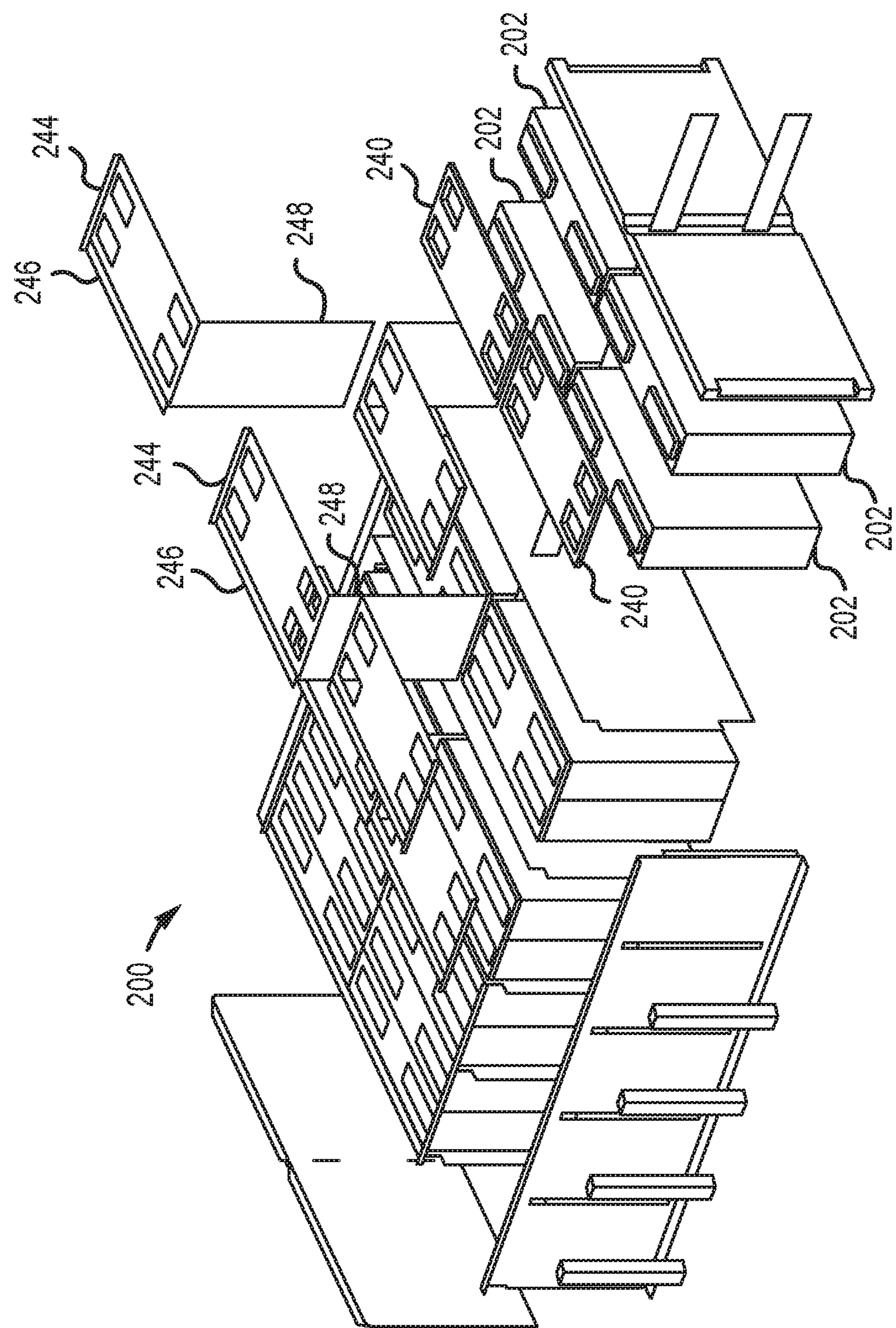
FIG. 2E is an exploded view of the battery pack of FIG. 2A, but in which sleeves cover the battery cells, according to an illustrative embodiment.

FIG. 2E is an exploded view illustrating an exemplary construction of battery pack 200 in accordance with some embodiments. In the example of FIG. 2E, sleeves 244 in battery pack 200 cover battery cells 202. Battery pack 200 includes a sleeve 244 covering one or more battery cells 202 disposed within each battery cell compartment 232. Sleeve 244 has a first portion 246 and a second portion 248. The first portion 246 covers the battery cells 202 along first sides having terminals 234 disposed therein. The first portion 246 has apertures configured to expose terminals 234 of the battery cells 202. The second portion 248 covers second sides of the battery cells 202. The second sides are adjacent the first sides and may be perpendicular thereto. In FIG. 2E, the sleeve 244 is depicted as enclosing two battery cells 202. However, this depiction is not intended as limiting. The sleeve 244 may enclose any number of battery cells 202. In some embodiments, the sleeve 244 includes steel (e.g., 304, 316, 1018, 4140, etc.). Optionally, an electrically-insulating member 240 is disposed over the side of the battery cell 202 having terminals 234.

Figure 2F:
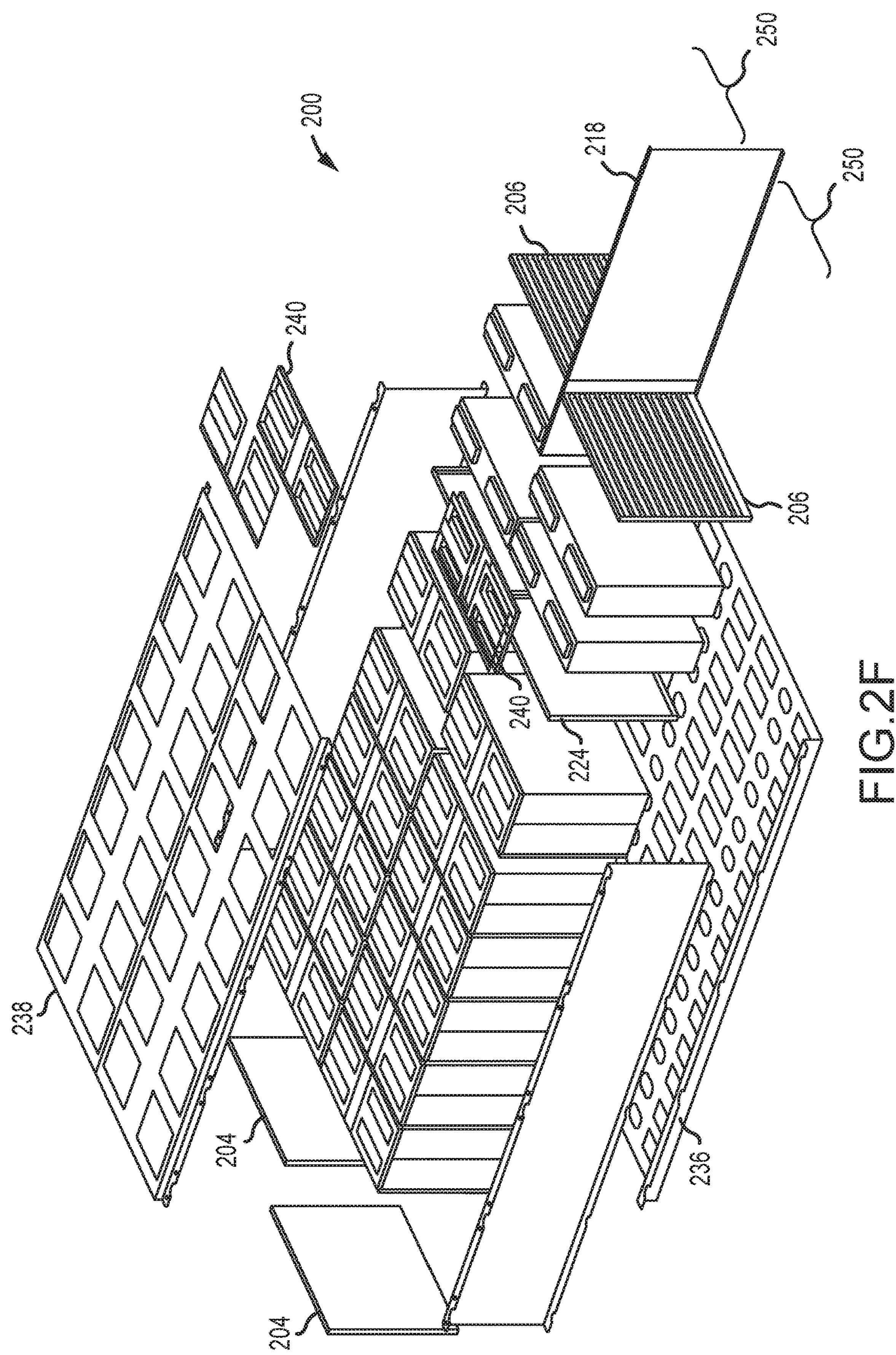
FIG. 2F is an exploded view of the battery pack of FIG. 2A, but in which the longitudinal member defines tubular structures within the battery pack, according to an illustrative embodiment.

FIG. 2F is an exploded view illustrating an exemplary construction of battery pack 200 in accordance with some embodiments. In the example of FIG. 2F, longitudinal member 218 is a tubular structure. Furthermore, battery pack 200 includes base panel 236 and a cover panel 238. The base panel 236 has openings configured to expose cell vents of the battery cell 202. The cover panel 238 has apertures configured to expose terminals 234 of the battery cell 202 in a first orientation, and may not include apertures in a second orientation where terminals 234 are on an opposite surface of the battery cells 202 where they may face base panel 236. Optionally, an electrically-insulating member 240 is disposed over the side of the battery cell 202 having terminals 234. In embodiments, the longitudinal member 218 divides the lateral member 224, the first end-member 204, and the second end-member 206 into separate portions. Such division partitions the perimeter 216 into a plurality of conduits 250. Portions of the lateral member 224 may function as bulkheads within the plurality of conduits 250. In FIG. 2F, the longitudinal member 218 divides the lateral member 224, the first end-member 204, and the second end-member 206 into two conduits 250. However, this depiction is not intended as limiting. Multiple longitudinal members 218 may be incorporated into the battery pack 200 to define any number of conduits 250

Figure 3A:
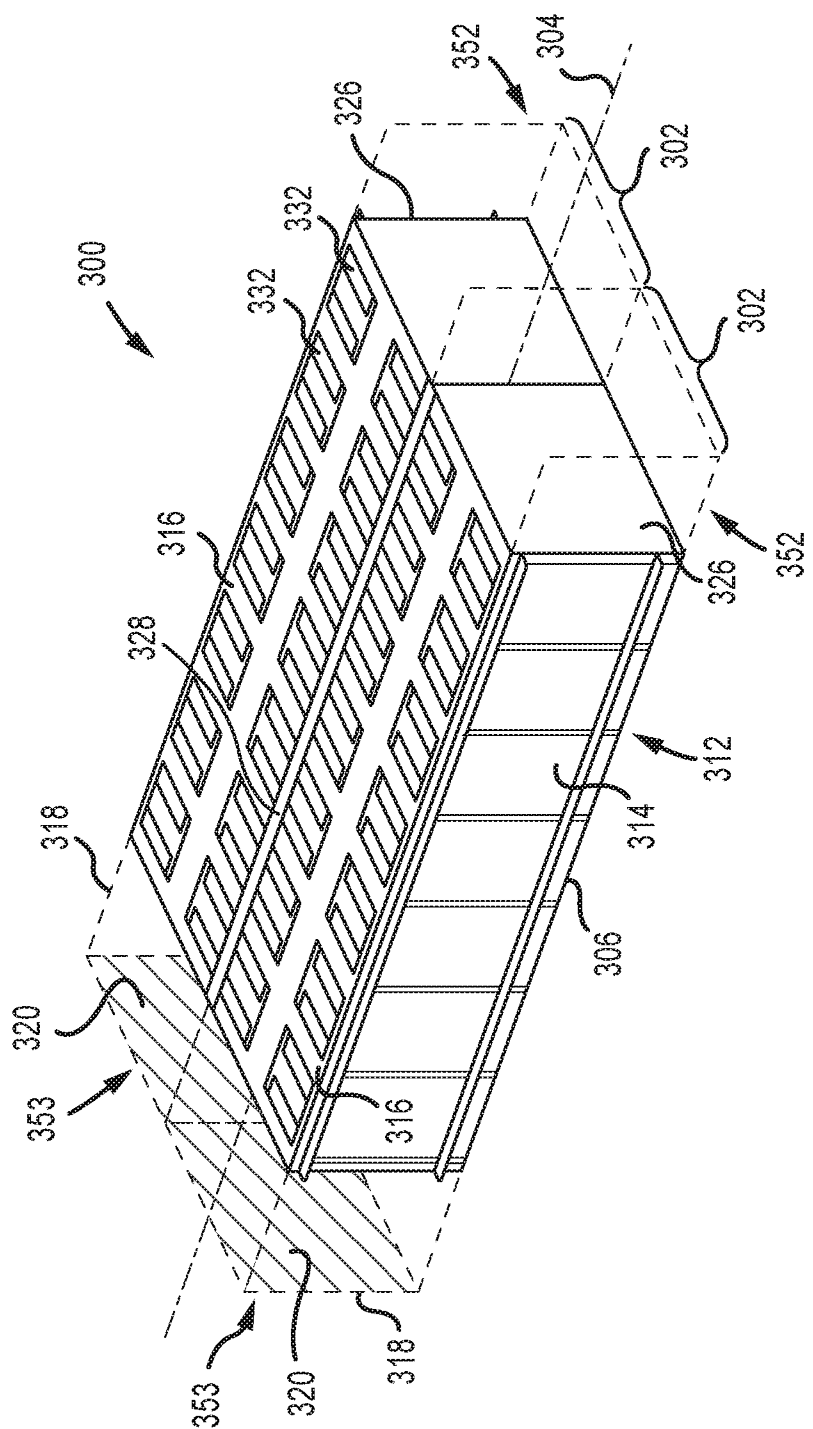
FIG. 3A is a perspective view of a battery pack having structural members that provide thermal management, according to another illustrative embodiment.
Figure 3B:
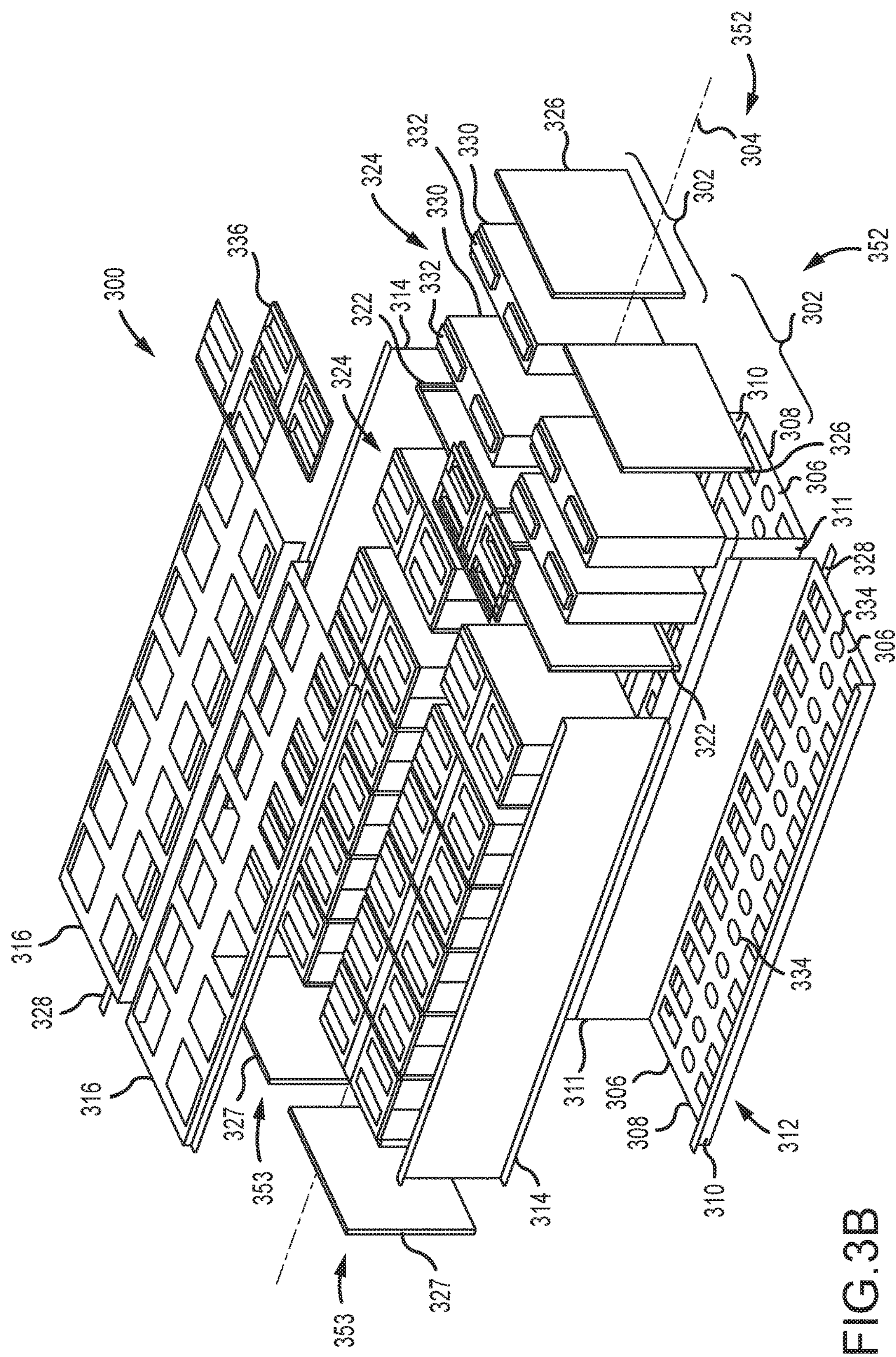
FIG. 3B is an exploded view of the battery pack of FIG. 3A.

Now referring to FIG. 3A, a perspective view is presented of a battery pack 300 having structural members that provide thermal management, according to some embodiments. FIG. 3B provides an exploded view of the battery pack 300 illustrated in FIG. 3A. The battery pack 300 includes a tubular structure 302, which in certain variations, may include a plurality of tubular structures 302 disposed side-by-side. FIG. 3A depicts a specific variation where two tubular structures 302 are disposed side-by-side. However, this depiction is not intended as limiting. The tubular structure 302 may be aligned parallel to a longitudinal axis 304 of the battery pack 300. Each tubular structure 302 includes a base member 306 having a bottom wall 308 extending from a first side wall 310 to a second side wall 311. In some embodiments, such as that shown in FIGS. 3A and 3B, an exterior-facing side wall 312 of the base member 306 includes a side beam 314.

Each tubular structure 302 also includes a cover member 316 coupled to the base member 306 so as to define a channel 318 therebetween. The channel 318 may have a cross-section 320 of any type, including a circular cross-section, an elliptical cross-section, a hexagonal cross-section, a square cross-section, and a rectangular cross-section. The cover member 316 has apertures configured to expose terminals of the battery cells. Each tubular structure 302 additionally includes a lateral member 322 disposed within the channel 318 to divide the channel 318 into a plurality of battery cell compartments 324. The lateral member 322 may serve as a bulkhead within the channel 318. In some embodiments, such as that shown in FIGS. 3A and 3B, the plurality of tubular structures 302 include a plurality of lateral members 322 within each channel 318.

It will be appreciated that any number of lateral members 322 may be disposed within the channel 318. Moreover, the lateral members 322 may be spaced so as to partition any combination of volumetric shapes therein. In this manner, the plurality of battery cell compartments 324 can be configured to have any number and combination of shapes within the channel 318. The plurality of battery cell compartments 324 may be different for each channel 318. In some embodiments, each of the plurality of battery cell compartments 324 is configured to contain two battery cells therein. In some embodiments, the plurality of battery cell compartments 324 is configured such that battery cells disposed therein have terminals aligned parallel to the lateral member 322.

A first end-member 326 is disposed at a first end 352 of the channel 318. Similarly, a second end-member 327 is disposed at a second end 353 of the channel 318. The end-members 326, 327 are operable to apply pressure longitudinally against battery cells and lateral members 322 disposed within the channel 318. In some embodiments, at least one of the base member 306 and the cover member 316 are configured to be in tension when the plurality of battery cell compartments 324 contains a row of battery cells extending from the first end-member 326 to the second end-member 327. This tension predisposes the end-members 326, 327 to compress battery cells within the plurality of battery cell compartments 324 (i.e., longitudinally, laterally, vertically, or a combination thereof). Such compression may reduce swelling of battery cells within the channel 318 during operation (e.g., during charging, discharging, etc.) Reduced swelling may improve performance, lifetime, or both, of battery cells utilized by the battery pack 300 to store and deliver electrical power.

In embodiments having the plurality of tubular structures disposed side-by-side, the battery pack 300 also includes a union member 328 disposed along a seam between adjacent tubular structures 302 and coupled to the adjacent tubular structures 302. Such coupling may involve any component of the tubular structure 302 (e.g., the base member 306, the cover member 316, etc.) Non-limiting examples of the union member 328 include rods, pipes, beams, strips, plates, brackets, bars, trusses, wire, and cable. Other types of union members 328 are possible. Coupling of the union member 328 to the adjacent tubular structures 302 may involve welds, brazes, adhesives (e.g. epoxies, cements, etc.), fasteners (e.g., pins, bolts, rivets, etc.), or some combination thereof. In some embodiments, such as that shown in FIGS. 3A and 3B, the union member 328 is a strip disposed along the seam. The strip may be welded to the adjacent tubular structures 302.

One or more battery cells 330 may be disposed within the channel 318 to yield the battery pack 300. In some variations, the battery cells 330 have terminals 332 on a side different than that of a cell vent (e.g., an opposite side, adjacent side, top side, etc.). In some variations, the battery cells 330 have terminals 332 on a similar surface as a cell vent. In some variations, the base member 306 may include a plurality of openings 334 configured to expose cell vents of the battery cells 330. In some variations, an electrically-insulating member 336 is disposed on a side of the battery cells 330 having terminals 332.

In some embodiments, the battery cells 330 occupy greater than 84% of a volume within the channel 318. In some embodiments, the battery cells 330 occupy greater than 86% of the volume within the channel 318. In some embodiments, the battery cells 330 occupy greater than 88% of the volume within the channel 318. In some embodiments, the battery cells 330 occupy greater than 90% of the volume within the channel 318. In some embodiments, the battery cells 330 occupy greater than 92% of the volume within the channel 318. In some embodiments, the battery cells 330 occupy greater than 96% of the volume within the channel 318. In some embodiments, the battery cells 330 occupy greater than 98% of the volume within the channel 318.

In general, the tubular structure 302 stiffens the battery pack 300 longitudinally while providing a thermal functionality. Stiffening of the battery pack 300 improves resistance to loads, e.g., vertical loads perpendicular to the base member 306 or the cover member 316. This improved resistance allows the battery pack 300 to incorporate longer rows of battery cells 330 than those associated with conventional battery packs. In some embodiments, stiffness of the battery pack 300 may be modified by altering a longitudinal tension of the base member 306, the cover member 316, or both.

The thermal functionality of the tubular structure 302 is aided by the lateral member 322, which segregates battery cells 330 within the tubular conduit 302. Such segregation produces the plurality of battery cell compartments 324. The plurality of battery cell compartments 324 isolates potential heat sources within controlled volumes for improved thermal management. These volumes are bounded by walls associated with individual battery cell compartments 324 (i.e., the lateral members 322 and portions of the base member 306 and the cover member 316). In some instances, the walls may include coatings or linings of thermally-insulating material (e.g., porous ceramics), thermally-conductive material (e.g., copper), intumescent material, or any combination thereof. In some embodiments, the walls may be thermally-coupled with a heat exchanger.

In some embodiments, the battery pack 300 includes a battery cell 330 disposed within at least one battery cell compartment 324. The battery cell 330 may have terminals on a side different than that of a cell vent (e.g., an opposite side, adjacent side, top side, etc.). The battery cell 330 may also have an electrically-insulating member 336 disposed on the side of the battery cell 330 having terminals 332. In some instances, the battery cell 330 occupies at least 90% of a volume of a battery cell compartment 324. In some instances, the battery cell 330 occupies at least 92% of a volume of a battery cell compartment 324. In some instances, the battery cell 330 occupies at least 94% of a volume of a battery cell compartment 324. In some instances, the battery cell 330 occupies at least 96% of a volume of a battery cell compartment 324. In some instances, the battery cell 330 occupies at least 98% of a volume of a battery cell compartment 324.

In some embodiments, the battery pack 300 includes two or more battery cells 330 disposed within at least one battery cell compartment of the plurality of battery cell compartments 324. A thermal divider may be disposed between adjacent battery cells 330. The thermal divider may be a thermally-insulating material (e.g., porous ceramics), a thermally-conductive material (e.g., copper), an intumescent material, or any combination thereof. In some instances, the battery cells 330 may each have terminals on a side opposite that of a cell vent. In some instances, the electrically-insulating member 336 is disposed on the side of each battery cell 320 having terminals 332.

Materials for components of the battery pack 300 may be selected by those skilled in the art based on considerations of yield strength, elastic modulus, thermal conductivity, and melting point. Other considerations are possible.

In some embodiments, at least one of the base member 306, the cover member 316, the lateral member 322, the first end-member 326, and the second end-member 327 comprise a material having a yield strength greater than 250 MPa. In some embodiments, at least one of the base member 306, the cover member 316, the lateral member 322, the first end-member 326, and the second end-member 327 comprise a material having a yield strength greater than 275 MPa. In some embodiments, at least one of the base member 306, the cover member 316, the lateral member 322, the first end-member 326, and the second end-member 327 comprise a material having a yield strength greater than 300 MPa. In some embodiments, at least one of the base member 306, the cover member 316, the lateral member 322, the first end-member 326, and the second end-member 327 comprise a material having a yield strength greater than 325 MPa. In some embodiments, at least one of the base member 306, the cover member 316, the lateral member 322, the first end-member 326, and the second end-member 327 comprise a material having a yield strength greater than 350 MPa. In some embodiments, at least one of the base member 306, the cover member 316, the lateral member 322, the first end-member 326, and the second end-member 327 comprise a material having a yield strength greater than 375 MPa.

In some embodiments, at least one of the base member 306, the cover member 316, the lateral member 322, the first end-member 326, and the second end-member 327 comprise a material having an elastic modulus greater than 65 GPa. In some embodiments, at least one of the base member 306, the cover member 316, the lateral member 322, the first end-member 326, and the second end-member 327 comprise a material having an elastic modulus greater than 80 GPa. In some embodiments, at least one of the base member 306, the cover member 316, the lateral member 322, the first end-member 326, and the second end-member 327 comprise a material having an elastic modulus greater than 95 GPa. In some embodiments, at least one of the base member 306, the cover member 316, the lateral member 322, the first end-member 326, and the second end-member 327 comprise a material having an elastic modulus greater than 110 GPa.

In some embodiments, at least one of the base member 306, the cover member 316, the lateral member 322, the first end-member 326, and the second end-member 327 comprise aluminum or an aluminum alloy (e.g., 2024, 6061, 7075, etc.). In other embodiments, at least one of the base member 306, the cover member 316, the lateral member 322, the first end-member 326, and the second end-member 327 comprise steel (e.g., 304, 316, 1018, 4140, etc.). In still other embodiments, at least one of the base member 306, the cover member 316, the lateral member 322, the first end-member 326, and the second end-member 327 comprise titanium or a titanium alloy (e.g., Grade 1, Grade 2, Grade 5, Grade 23, etc.).

In some embodiments, at least one of the base member 306, the cover member 316, and the lateral member 322 comprise a material having a thermal conductivity greater than 10 μm/m·° C. In some embodiments at least one of the base member 306, the cover member 316, and the lateral member 322 comprise a material having a melting point greater than 550° C. In some embodiments, at least one of the base member 306, the cover member 316, and the lateral member 322 comprise steel (e.g., 304, 316, 1018, 4140, etc.). In still other embodiments, at least one of the base member 306, the cover member 316, and the lateral member 322 comprise titanium or a titanium alloy (e.g., Grade 1, Grade 2, Grade 5, Grade 23, etc.).

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A battery pack comprising:

a first end-member positioned opposite a second end-member and parallel thereto;

a first side beam positioned opposite a second side beam and parallel thereto, wherein the first side beam and the second side beam extend between the first end-member and the second end-member;

a longitudinal member disposed between the first side beam and the second side beam to define a longitudinal row; and an array of battery cell compartments disposed within the longitudinal row, each of the battery cell compartments enclosing at least two battery cells, wherein at least one of the longitudinal member, the first side beam, and the second side beam are configured to be in tension when the array of battery cell compartments extend in the longitudinal row from the first end-member to the second end-member.

2. The battery pack of claim 1, further comprising a lateral member disposed between the first end-member and the second end-member to partition the longitudinal row into the battery cell compartments.

3. The battery pack of claim 1, wherein the at least two battery cells occupy greater than 90% of a volume of a battery cell compartment.

4. The battery pack of claim 1, wherein at least four battery cells are disposed within a battery cell compartment of the array of battery cell compartments.

5. The battery pack of claim 1, wherein the lateral member comprises aluminum.

6. The battery pack of claim 1, further comprising a sleeve enclosing a plurality of the battery cells disposed within a lateral row of battery cells.

7. The battery pack of claim 6, wherein the sleeve comprises a first portion extending across the terminals of the battery cells, and wherein the sleeve comprises at least one second surface extending normal to the first surface and extending across a side of the battery cells.

8. The battery pack of claim 1, further comprising a base panel having a surface facing a cell vent of each battery cell in the array of battery cell compartments.

9. The battery pack of claim 1, further comprising a cover panel at least partially defining an enclosure of the battery cells.

10. The battery pack of claim 1, wherein the longitudinal member facilitates cooling of the battery cell compartments.

11. A battery pack comprising:

a base member;

a cover member;

two longitudinal members extending parallel to one another and coupled between the base member and the cover member to define a channel between the two longitudinal members;

a lateral member disposed within the channel to divide the channel into battery cell compartments;

a battery cell disposed within each battery cell compartment, wherein each battery cell comprises a vent facing the base member;

a first end-member disposed at a first end of the channel; and a second end-member disposed at a second end of the channel.

12. The battery pack of claim 11, further comprising at least two battery cells disposed within each battery cell compartment.

13. The battery pack of claim 12, wherein the at least two battery cells occupy greater than 90% of a volume of a battery cell compartment.

14. The battery pack of claim 11, wherein each battery cell comprises terminals facing the base member.

15. The battery pack of claim 11, further comprising a sleeve extending about the battery cell compartments.

16. The battery pack of claim 15, wherein the sleeve comprises a surface proximate and parallel to one of the two longitudinal members.

17. The battery pack of claim 15, wherein the sleeve comprises a thermally-insulating material.

18. The battery pack of claim 11, further comprising a heat exchanger, wherein the heat exchanger extends between a surface of each battery opposite its vent and a surface of the cover member.

19. The battery pack of claim 11, wherein the tension reduces swelling of incorporated battery cells during operation.

20. A battery pack comprising:

a first end-member positioned opposite a second end-member and parallel thereto;

a first side beam positioned opposite a second side beam and parallel thereto, wherein the first side beam and the second side beam extend between the first end-member and the second end-member;

a lateral member disposed between the first end-member and the second end-member, wherein the first end-member and the second end-member define at least two battery cell compartments; and at least two battery cells disposed within at least one battery cell compartment, wherein at least one of the lateral member, the first end-member, and the second end-member are tensioned against the battery cells to compress the battery cells along a lateral axis.

21. The battery pack of claim 20, further comprising a longitudinal member disposed between the first side beam and the second side beam.

22. The battery pack of claim 20, further comprising at least four battery cells disposed within each battery cell compartment.

* * * * *